UNITED STATES PATENT OFFICE.

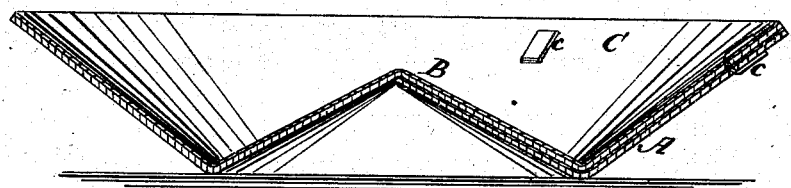
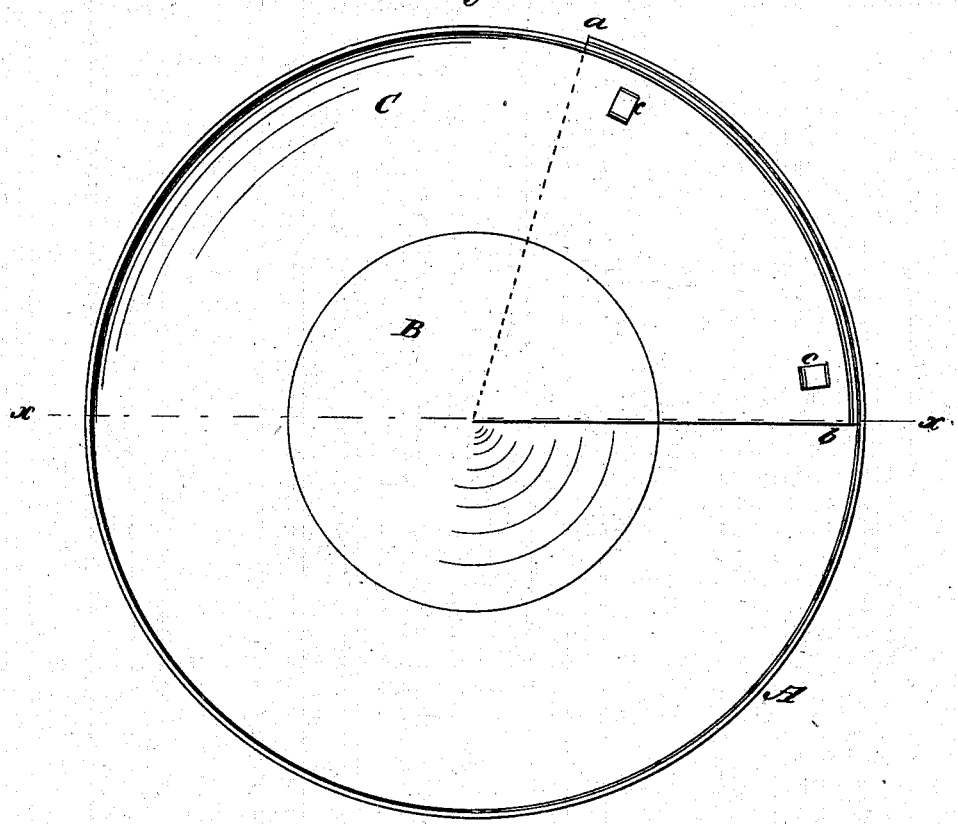

SYLVESTER E. HARLOW, OF FAIRBURY, ILLINOIS.

IMPROVEMENT IN PAPER DISHES.

Specification forming part of Letters Patent No. 186,247, dated January 16, 1877; application filed October 14, 1876.

*To all whom it may concern:*

Be it known that I, SYLVESTER E. HARLOW, of Fairbury, in the county of Livingston and State of Illinois, have invented a new and Improved Paper Butter-Dish, of which the following is a specification:

Figure 1 is a transverse section on line $x\ x$ in Fig. 2. Fig. 2 is a top view.

Similar letters of reference indicate corresponding parts.

My invention consists in a dish made from a disk of pasteboard or thick paper, having a conical bottom and flaring sides. The said disk is cut radially from the center to the circumference, and the edges thus formed are lapped and secured by cement or clips. The whole is coated with a mixture that renders it impervious to water or grease.

The dish is made from a disk of paper which is cut radially from the center to the circumference, and it is stamped or crimped so as to form a conical bottom, that projects upward, and the flaring rim. The radial edges of the disk are thus made to overlap each other, and are secured by clips.

Referring to the drawing, A is a dish made from paper or pasteboard, having the conical bottom B and the flaring rim C. The edges $a\ b$, formed by the radial cut in the disk, overlap each other, and are secured by clips $c\ c$.

The entire surface of the dish thus formed is made partially impervious to grease and water by giving it a coating of paste consisting of a mixture of mucilage made from gum-arabic and rice-flour paste.

The dish may be covered on one or both sides with glazed or ornamental paper, if desired.

The advantages claimed for this dish are, that butter and other articles may be contained or carried in it without injury. It is so inexpensive that it can be furnished by dealers gratis, and after use it may be thrown away.

Having thus described my invention, I claim as new and desire to secure by Letters Patent—

A dish formed of a paper disk, cut radially from the center, crimped to produce a conical bottom, B, as well as an outwardly-flaring rim, C, and having its overlapped edges $a\ b$ secured, as shown and described.

SYLVESTER E. HARLOW.

Witnesses:
DEMAS ELLIOTT,
HENRY REMINGTON.